Oct. 11, 1949.  J. H. SPIRA  2,484,253
GIRDLE FINISHING DEVICE
Filed March 16, 1946
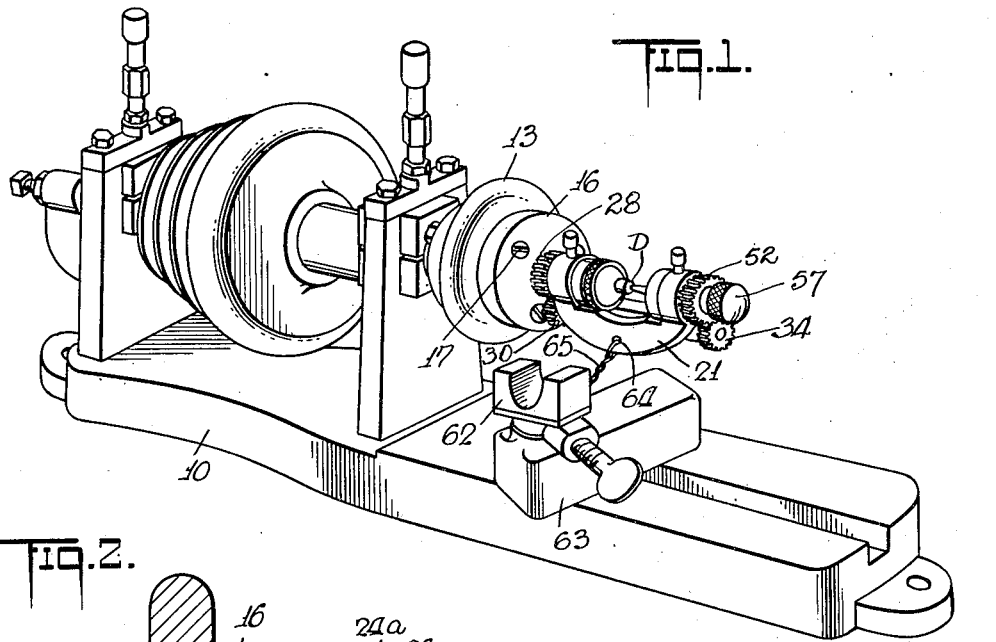
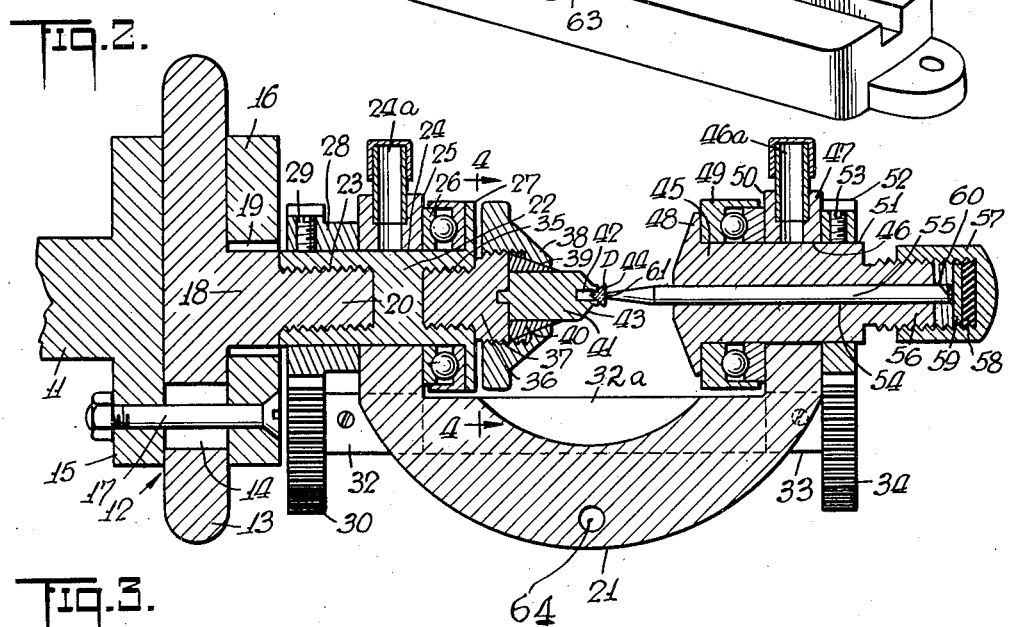
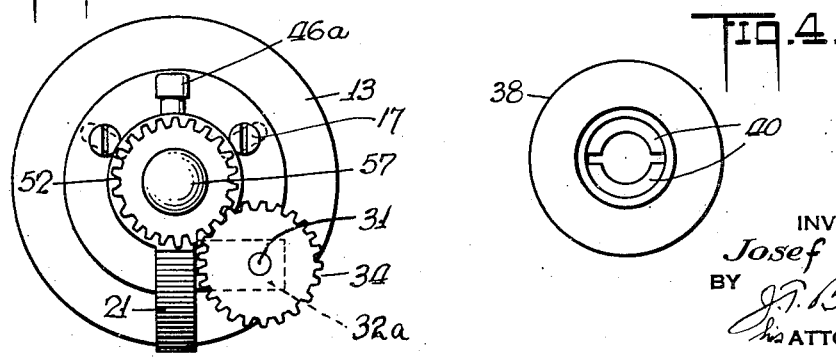
INVENTOR
Josef H. Spira
BY
J. J. Basseches
his ATTORNEY Patented Oct. 11, 1949

2,484,253

UNITED STATES PATENT OFFICE 2,484,253

GIRDLE FINISHING DEVICE

Josef H. Spira, New York, N. Y.

Application March 16, 1946, Serial No. 654,940

13 Claims. (Cl. 51—229)

1

This invention relates to a diamond grinding device; more particularly to a machine for bruting diamonds and for effecting the girdle formation thereof. This application is an improvement over my co-pending application Serial No. 505,100 for Gem grinding device, now Patent No. 2,420,502, granted May 13, 1947.

In my co-pending application aforesaid I have disclosed a bruting device which is to be associated with a diamond cutter's lathe. In such device, a floating chuck spindle carrying the diamond may be adjusted to avoid losses in size of stock due to eccentricity of the chuck spindle. A counter-pressure pin which presses the diamond on the seat of the rotating chuck spindle is carried in synchronism with the adjustable chuck spindle. This device, while used for bruting the diamond before the pavilion facets and the bezel facets are formed thereon, is also valuable for refinishing the girdle after the pavilion facets and bezel facets and table have been formed, where, as a result of one or both of the pavilion and bezel faceting operations, the girdle terminates in an edge which is too fine to withstand the diamond setting operation without chipping readily, or has been chipped as a result of the pavilion or bezel faceting operations.

Furthermore, where sawing leaves the table rather rough or the seats employed for engaging the pavilion portion of the diamond stock have become worn due to the constant pressure applied to them, I have found it desirable, and have disclosed the desirability of rotating the counter-pressure pin in its socket or the provision of suitable rotary bearing means for the counter-pressure pin and its socket. The intense pressure for mechanically holding the diamond upon its seat by means of the counter-pressure pin sets up frictional forces which require minute tolerances; otherwise unusual expense would be involved for maintenance and repair.

I have found, and it is an object of my invention to provide in a diamond finishing lathe, a bruting device wherein the features of my prior aforementioned application may be practiced, while achieving long life and minimum requirements for replacement and repair. I have found that by combining synchronization in drive between the counter-pressure pin and the chuck spindle, with a self-aligning of the counter-pressure pin and the table of the diamond, that even the most delicate girdles may be refinished and the refinishing of girdles practiced or the initial bruting operation effected with the minimum amount of loss of the diamond stock.

2

Accordingly, it is a further object of my invention to provide a holder for diamonds for effecting the bruting operation wherein eccentric adjustment of the diamond may be effected, while mechanically holding the same to eccentrically adjust the seat which positively spins the diamond in synchronism with a counter-pressure pin, with a positive drive of the counter-pressure pin and accompanied by applying elastic pressure to the table engaging surface of the pin, under conditions whereby play, due to tolerances or wear or distortion of the diamond engaging seat, does not disrupt the trueness of the bruting operation.

It is still further an object of my invention to provide in a diamond cutter's lathe having a chuck for adjustment eccentrically for bruting irregularly shaped diamond stock or refinishing the girdle of faceted diamonds, a bruting dop which under high speed rotation frictionally or mechanically holds the diamond stock, the diamond stock being held on the seat by a counter-pressure member engaging the flat table forming portion of the diamond stock, and is positively rotated in synchronism with the chuck spindle, and mounted on an arm which is adjustable in synchronism with the chuck spindle in the adjustment of the spindle in relation to the fixed axis of the chuck.

More particularly, it is contemplated by my invention to provide a diamond bruting dop including a holder for a raw diamond or a diamond whose girdle is to be refinished, whereby it may be spun at bruting speeds and includes means for connection to an eccentrically adjustable spindle of a diamond cutter's lathe, there being journaled on the diamond holding segment an arm supporting a counter-pressure pin, mounted for rotation positively, and in synchronism with the dop, and still more particularly including means for supporting the counter-pressure pin during the application of pressure of its bearing surface on the diamond, under conditions minimizing the effects of wear and disalignment.

Still more particularly, it is an object of my invention to provide a bruting dop for bruting the raw stone and which is also valuable in refinishing the girdle of a faceted diamond, which simplifies the labor involved in bruting and which is economical to maintain in good repair.

To attain these objects and such further objects as may appear herein or be hereinafter pointed out, I make reference to the accompanying drawing forming a part hereof, in which—

Figure 1 is a perspective view illustrating my invention;

Figure 2 is a magnified sectional view of the lathe head and dop;

Figure 3 is an end elevation;

Figure 4 is a section taken on the line 4—4 of Figure 2.

Making reference to the drawing, I illustrate, as in my prior mentioned application, a diamond cutter's lathe 10, having the usual driving spindle 11 and a chuck 12. The chuck comprises a plate 13, provided with the usual radial slots 14, which plate 13 is held upon the end plate 15 by a friction plate 16, employing bolts 17. The plate 13 is provided with a chuck spindle 18, extending through the enlarged opening 19 of the friction plate 16. The chuck spindle 18 includes a threaded stem 20, which in the standard lathe may receive a cement holding bruting dop therein.

In the present embodiment I provide a holder frame 21, including a dop spindle 22, having a threaded socket 23 for connection to the stem 20. The dop spindle 22 is journalled in the bearing 24, in one end of the holder frame 21. An oil cap 24a serves as the means for supplying lubricant to this bearing.

The inner branch of the holder frame 21 is provided with a face 25 to receive the thrust bearing race 26. An outer flange 27 on the dop spindle bears against the outer ball race 26. The top spindle extends through the bearing 24 and is held against lateral movement in one direction by the pinion 28, a set screw 29 holding the pinion 28 against displacement.

The pinion 28 meshes with the gear 30 on the countershaft 31, which is journalled in an extension 32a on the rear face of the holder frame 21. The countershaft 31 is provided with a pinion 34 on the free end thereof, for purposes which will appear hereinafter. Set screws affixed to the extensions 32 and 33 of the pinions 30 and 34 key the pinions and countershaft 31 for positive rotation.

The dop spindle is formed with a threaded socket 35, threadedly to receive a threaded lug 36, whose head 37 may receive the quick acting chuck 38. The quick acting chuck 38 comprises a conical bearing 39, acting upon the chuck segments 40, 40, holding the adapter 41. The adapter 41 has its forward end provided with a socket 42 in the conically directed nose 43, a rim being provided which may conform to the diamond stock. This rim forms a seat for the diamond stock by internally faceting the same to conform to the sloping sides of the diamond stock D. The diamond stock D may be the natural octahedral crystal or a faceted diamond whose pavilion portion and bezel portion have already been faceted. The position of the diamond in the adapter socket is to expose the table forming portion 44.

It is understood that this table forming portion in some diamond stock may be smooth and polished, as in a faceted diamond whose girdle has to be refinished, or it may be rough, as a result of the sawing of the diamond, leaving the table forming portion rough.

For a diamond in this position, I provide a plug 45 which is journaled for rotation in the bearing 46, formed in the branch 47 of the holder frame. An oil cap 46a serves as the means for supplying lubricant to this bearing.

The plug 45 is formed with a flange 48, bearing against the thrust bearing roller race 49, positioned on the inner face 50 of the branch 47. The plug 45, at its free end 51, is provided with a pinion 52, held thereon by the set screw 53. This pinion is arranged to mesh with the pinion 34 previously described.

The plug 45 has a boring 54, through which extends the counter-pressure pin 55 for axial sliding movement. Rearwardly, the plug 45 is provided with a neck 56, externally threaded to receive the adjusting cap 57. The adjusting cap 57 is provided internally with a resilient facing 58, over which is positioned a bearing disk 59 for contacting the bearing end 60 of the counter-pressure pin 55. The inner contacting edge 61 of the counter-pressure pin 55 bears against the table forming portion 44.

The pressure point 60 is made remote from the contacting end 61 by being directed substantially outside of the frame in order to minimize the tilt adjacent the portion 61. This I accomplish by making the arc through which the counter-pressure pin may tilt as large as possible within the tolerances permitted by the moving parts, for purposes which will appear hereinafter.

With the assembly thus provided, the diamond stock D is nested within the lips of the rim 43, to expose the table forming portion 44. The adjusting cap 57 is then brought into firm engagement with the end 60 of the counter-pressure pin 55, to maintain the diamond stock D on the seat of the adapter 43 for spinning operation during bruting.

The holder, as an assembly, is then mounted upon the stem 20. In this position the diamond is rotated positively as the chuck spindle stem drives the adapter 41. Positive synchronous rotation is given to the counter-pressure pin 55, through the counter shaft 31 which drives the plug 45. During such rotation, the operator may rest the finishing stick carrying a bruting diamond upon the saddle 62, carried by the tool rest 63.

The holder frame 21 is perforated at 64, to tie the frame to the tool rest as by an anchoring wire 65.

As in my prior invention, with the holder thus mounted, centering of the stock D may be performed by the operator in the usual way—that is, by tapping the chuck plate 13, to reduce the eccentric position of the stock, to obtain the maximum girdle size for the diamond. The anchoring wire 65, while restraining the holder frame, in no way interferes with the centering operation.

In view of the fact that the stone is held for rotation merely by mechanical friction against the bruting or finishing stick, considerable end thrust is involved by the pressure applied to the diamond by the counter-pressure pin through the cap 57. Wear and tear on the contacting end 61 of the counter-pressure pin is minimized by the synchronous movement of the dop and the counter-pressure pin, thereby making it immaterial whether the table forming face 44 has been faceted to a smooth condition, or is rough as a result of the sawing operation before the table has been polished.

As pressure on the adapter 41 tends to distort the comparatively malleable adapter 41, axial displacement of the diamond and lack of trueness of the stem, or a tendency for axial disalignment of the counter-pressure pin will not vitally affect the operation of the device as the counter-pressure pin will align itself on the more remotely positioned pressure point afforded by the disk 59 held by the cap 57. The pivotal contact of the end 60 on the plate 59 as may occur by the wear involved in the use aforesaid, coupled with the resilient action obtained by the facing 58 prevents fracture of the diamond during the bruting operation, and minimizes the heat of friction in the bearings for the dop spindle and plug, respectively.

It will thus be observed that I have provided an improved holder or dop for carrying out bruting or girdle refinishing operations, enabling mechanical holding of small stock material whereby the finishing operation may be quickly and accurately performed and minimizing the wear and tear on the moving parts under the pressure involved in rapidly rotating the diamond, while under the pressure requisite for moving against the finishing stick.

Having thus described my invention and illustrated its use, what I claim as new and desire to secure by Letters Patent is:

1. In a diamond cutter's lathe for carrying out the bruting operation having a chuck holding a chuck spindle for adjustment eccentrically for bruting the girdle forming portion of diamond stock, comprising a pavilion portion and a table forming face, said spindle having means for mounting a bruting dop for rotation at bruting speeds, a bruting dop on said spindle having a seat formed to engage the pavilion portion of the diamond, the combination therewith of a counter-pressure pin having an end for engaging the face of the diamond during rotation, said pin being carried by an arm journalled concentrically with said chuck spindle and mounted to move in synchronism with the chuck spindle in the adjustment of the chuck spindle in relation to the fixed axis of the chuck, and means for positively driving said counter-pressure pin and bruting dop in synchronism and means for feeding the counter-pressure pin toward the dop to hold the diamond under pressure on the dop.

2. In a diamond cutter's lathe in accordance with claim 1, wherein said pin is fed resiliently by said means for feeding the same.

3. In a diamond cutter's lathe in accordance with claim 1, wherein the means for feeding the counter-pressure pin includes a resilient bearing for the end of said counter-pressure pin formed to yield to pressure on said pin.

4. In a diamond cutter's lathe having a chuck spindle capable of eccentric adjustment to center the diamond, a frame for said spindle, a counter-pressure pin for holding the diamond frictionally for rotation, means on said frame for mounting the counter-pressure pin, said frame having a bearing journalled on said chuck spindle and means for rotating said counter-pressure pin whereby said adjustment of said chuck spindle and counter-pressure pin and rotation of said chuck spindle and counter-pressure pin may be in synchronism.

5. In a diamond cutter's lathe having a chuck holding a chuck spindle for adjustment eccentrically for bruting, a girdle forming portion of the diamond comprising a pavilion portion and a table forming face, said spindle having means for mounting a bruting dop for rotation at bruting speeds, a bruting dop on said spindle having a seat socketed for engaging the pavilion portion of the diamond, the combination therewith of a U-shaped arm having one end journalled concentrically with said chuck spindle, the arm being mounted to move in synchronism with the chuck spindle in the adjustment of the chuck spindle in relation to the fixed axis of the chuck, a plug journalled in the other end of the arm, means for driving the plug connected to said chuck, a counter-pressure pin having an end for engaging the table forming face of the diamond during rotation, said pin being mounted for adjustment longitudinally of said plug, and for rotation therewith.

6. In a diamond cutter's lathe having a chuck holding a chuck spindle for adjustment eccentrically for bruting, a girdle forming portion of the diamond comprising a pavilion portion and a table forming face, said spindle having means for mounting a bruting dop for rotation at bruting speeds, a bruting dop on said spindle having a seat socketed for engaging the pavilion portion of the diamond, the combination therewith of a U-shaped arm having one end journalled concentrically with said chuck spindle, the arm being mounted to move in synchronism with the chuck spindle in the adjustment of the chuck spindle in relation to the fixed axis of the chuck, a plug journalled in the other end of the arm, means for driving the plug connected to said chuck, a counter-pressure pin having an end for engaging the table forming face of the diamond during rotation, said pin being mounted for adjustment longitudinally of said plug, and for rotation therewith, said plug having a threaded element for feeding said pin toward the dop, to hold the diamond under pressure on the dop.

7. In a diamond cutter's lathe in accordance with claim 6 wherein said element has a cupped member including a bearing for the remote end of said pin.

8. A diamond bruting dop comprising a holder having a socketed seat for the pavilion forming portion of the diamond to be bruted, including means for connection of the holder to an eccentrically adjustable spindle of a diamond cutter's lathe, a bearing on said dop, a substantially U-shaped arm, one branch of which is journalled on said bearing, the other branch of said arm carrying a counter-pressure pin having a contacting end for pressing upon a small axial portion of the diamond, sleeve means for mounting said pin and feeding the same toward said dop seat, means for journalling said sleeve for rotation and means connected with said dop for positively rotating said sleeve and dop in synchronism.

9. A diamond bruting dop comprising a holder for a diamond to be bruted at its girdle forming portion, including means for connection of the holder to an eccentrically adjustable lathe spindle of a diamond cutter's lathe, a bearing on said dop, a substantially U-shaped arm, one branch of which is journalled on said bearing, the other branch of said arm having a bearing in which is journalled a counter-pressure pin holder including means for feeding said holder toward said dop seat to press the counter-pressure pin held thereby on said seat for engagement of the diamond therewith during bruting operations, gear means on said dop and pin holder and means on said U-shaped arm journalling a counter shaft and gears for rotationally driving said pin holder and dop in synchronism.

10. A diamond bruting dop comprising a holder for a diamond to be bruted at its girdle forming portion including means for connection of the holder to an eccentrically adjustable spindle of a diamond cutter's lathe, a bearing on said dop, a substantially U-shaped arm, one branch of which is journalled on said bearing, a plug journalled in the other branch of said arm having an axial boring arranged to hold a counter-pressure pin adjustably along the axial line thereof and means for coupling said dop and plug for synchronous rotation.

11. A diamond bruting dop comprising a holder for a diamond to be bruted at its girdle forming portion including means for connection of the holder to an eccentrically adjustable spindle of a diamond cutter's lathe, a bearing on said dop, a substantially U-shaped arm, one branch of which is journalled on said bearing, a plug journalled in the other branch of said arm having an axial boring arranged to hold a counter-pressure pin adjustably along the axial line thereof and means for coupling said dop and plug for synchronous rotation, and screw fed means on said plug for adjustably feeding said pin.

12. A diamond bruting dop comprising a holder for a diamond to be bruted at its girdle forming portion including means for connection of the holder to an eccentrically adjustable spindle of a diamond cutter's lathe, a bearing on said dop, a substantially U-shaped arm, one branch of which is journalled on said bearing, a plug journalled in the other branch of said arm having an axial boring arranged to hold a counter-pressure pin adjustably along the axial line thereof and means for coupling said dop and plug for synchronous rotation, and screw fed means on said plug for adjustably feeding said pin comprising a cap threaded on said plug having a resiliently supported pressure disk.

13. A diamond bruting dop comprising a holder for a diamond to be bruted at its girdle forming portion including means for connection of the holder to an eccentrically adjustable spindle of a diamond cutter's lathe, a thrust bearing on said dop, a substantially U-shaped arm, one branch of which is journalled on said dop and bears against said thrust bearing, a plug journalled in the other branch of said arm, a counter-pressure pin mounted in said plug and having a contacting end for engaging a small axial portion of the diamond on a flat portion thereof and extending to the inside of said last branch to press the diamond against said holder when the pressure pin is moved toward the holder for rotation thereby, said pin having a bearing end extending to the other side of said branch through said plug and a cap for said plug extended to the outside of said second branch, said cap including a resiliently backed bearing disk for the bearing end of said counter-pressure pin.

JOSEF H. SPIRA.

REFERENCES CITED

The following references are of record in the file of this patent:

UNITED STATES PATENTS

| Number | Name | Date |
| --- | --- | --- |
| 1,449,266 | Clarke | Mar. 20, 1923 |
| 2,227,243 | Brown | Dec. 31, 1940 |
| 2,274,520 | Baumgold | Feb. 24, 1942 |